United States Patent [19]

Lauterbach

[11] Patent Number: 4,614,674

[45] Date of Patent: Sep. 30, 1986

[54] POWDER COATING COMPOSITIONS FOR THE PREPARATION OF MATT COATINGS

[75] Inventor: Horst Lauterbach, Therwil, Switzerland

[73] Assignee: Ciba-Geigy Corporation, Ardsley, N.Y.

[21] Appl. No.: 730,121

[22] Filed: May 3, 1985

[30] Foreign Application Priority Data

May 11, 1984 [CH] Switzerland ............ 2338/84

[51] Int. Cl.$^4$ .............................................. B05D 3/02
[52] U.S. Cl. .................................... 427/386; 523/440; 523/442; 523/453; 523/455; 523/456; 523/457; 523/459; 523/460; 523/465; 524/904
[58] Field of Search ............. 523/453, 455, 456, 457, 523/459, 460, 440, 442, 465; 524/904; 106/270; 427/212, 386

[56] References Cited

U.S. PATENT DOCUMENTS

| | | | |
|---|---|---|---|
| 2,943,955 | 7/1960 | Brill | 106/270 |
| 3,365,328 | 1/1968 | Coover et al. | 106/270 |
| 3,397,254 | 8/1968 | Wynstra et al. | 525/438 |
| 3,872,040 | 3/1975 | Mollohan et al. | 524/277 |
| 3,883,363 | 5/1975 | Yates et al. | 106/268 |
| 3,909,472 | 9/1975 | Fischer et al. | 106/270 |
| 3,937,751 | 2/1976 | Schmid et al. | |
| 4,145,370 | 3/1979 | Sreeves | 523/459 |
| 4,147,737 | 4/1979 | Sein et al. | 428/418 |
| 4,175,173 | 11/1979 | Bagga et al. | 528/97 |
| 4,182,840 | 1/1980 | Meyer et al. | 525/437 |
| 4,242,253 | 12/1980 | Yallourakis | 525/113 |
| 4,285,994 | 8/1981 | Pearce et al. | 524/904 |
| 4,412,034 | 10/1983 | Meyer et al. | 524/791 |

FOREIGN PATENT DOCUMENTS 56-98216 8/1981 Japan.
1595631 8/1981 United Kingdom.

OTHER PUBLICATIONS

Chem. Abst. 90, 7719h (1979).

*Primary Examiner*—Lewis T. Jacobs
*Attorney, Agent, or Firm*—Luther A. R. Hall

[57] ABSTRACT

Addition of waxes or wax-like substances, in conjunction with metal salts or metal complexes of organic compounds, to powder coating compositions based on epoxy resins and carboxyl-terminated polyesters affords a matting effect without substantially impairing the other properties of said coating composition.

17 Claims, No Drawings

POWDER COATING COMPOSITIONS FOR THE PREPARATION OF MATT COATINGS

The present invention relates to epoxy resin/polyester powder coating compositions which contain wax or wax-like substances in conjunction with metal compounds as matting agents, and to the use of said compositions for the preparation of matt coatings.

The formation of homogeneous thin coatings prepared from epoxy resin powder coating compositions is known and, for environmental and economic reasons, is being increasingly preferred to the use of solvent-containing coatings. Suitable hardeners for the epoxy resin are, for example, compounds that contain a number of carboxyl groups, for example polycarboxylic acids or carboxyl-terminated polyesters. Such powder coating compositions are disclosed for example in DE-OS No. 28 38 841, DE-OS No. 2 163 962 and U.S. Pat. No. 3,397,254.

The problem of preparing matt coatings, which are desirable for many utilities, with powder coating compositions has still not been satisfactorily solved. The additives frequently incorporated in solvent-containing coating compositions, for example silica, talcum, mica, chalk or metal soaps, do not have the desired effect in powder coating compositions. Either the reduction in gloss is insufficient or, if the matting effect is enhanced, an impairment of one or more other properties of the coating composition, for example mechanical properties, thermal resistance and/or adhesive strength, must be accepted. In contradistinction thereto, the present invention permits a substantial reduction in gloss without material impairment of the other properties of the coating composition. This is achieved by simultaneously incorporating waxes or wax-like substances and metal compounds as matting agents. This feature is all the more surprising, as coating films with increased gloss prepared from powder coating compositions are obtained according, for example, to U.S. Pat. No. 3,872,040 and JP Kokai No. 81/98216 by addition of waxes alone.

Accordingly, the present invention relates to a powder coating composition comprising
  (a) an epoxy resin,
  (b) a saturated carboxyl-terminated polyester,
  (c) a wax or wax-like substance, and
  (d) a metal salt or metal complex of an organic compound, wherein the metal is selected from the group consisting of Mg, Ca, Sr, Ba, Zn, Al, Sn and Sb.

The components (a) to (d) may each be individual compounds or mixtures of different compounds.

The customary epoxy resins suitable for powder coatings can be employed as component (a). Such compounds are described for example in DE-OS No. 28 38 841. The subject matter of this publication accordingly falls within the scope of the present invention.

The resins employed preferably have an epoxide content of 0.5 to 12 equivalents per kg. The preferred epoxy resins are solid at room temperature and, if necessary, can be advanced by reaction with e.g. a divalent phenol.

Particularly preferred epoxy resins are those containing on average more than one epoxy group in the molecule and are polyglycidyl derivatives of aromatic or aromatic heterocyclic compounds.

Particularly preferred resins are non-advanced or advanced polyglycidyl ethers of 2,2-bis(4'-hydroxyphenyl)propane (bisphenol A), 2,2-bis(3',5'-dibromo-4'-hydroxyphenyl)propane (tetrabromobisphenol A), of bis(4-hydroxyphenyl)methane (bisphenol F), and of novolaks, polyglycidyl derivatives of 4,4'-diaminodiphenylmethane, of 4,4'-diaminodiphenylsulfone, and of 2,4,6-trihydroxy-1,3,5-triazine (cyanuric acid), for example triglycidyl isocyanurate.

Carboxyl-terminated saturated polyesters suitable as component (b) preferably contain on average more than two carboxyl groups per molecule, have an acid number of 15 to 100, and have an average molecular weight in the range from 500 to 10,000. The polyesters employed are preferably solid at room temperature and have a glass transition temperature in the range from 40° to 80° C.

Such polyesters are described for example in U.S. Pat. No. 3,397,254 and in DE-OS No. 21 63 962. They can be obtained for example by reacting hydroxyl-terminated polyesters with tricarboxylic acids or tetracarboxylic dianhydrides. The hydroxyl-terminated polyesters are, in turn, reaction products of polyols with dicarboxylic acids or dicarboxylic anhydrides, and advantageously have an average degree of polymerisation of at least 3, in general from 3 to 25, preferably from 5 to 12.

Examples of suitable polyols are ethylene glycol, glycerol, 1,4-butanediol, neopentanediol and cyclohexanediol.

Examples of dicarboxylic acids are isophthalic acid, terephthalic acid, cyclohexanedicarboxylic acid, succinic acid, glutaric acid, adipic acid, pimelic acid, suberic acid, azelaic acid or sebacic acid.

Examples of suitable tricarboxylic anhydrides are anhydrides of aliphatic tricarboxylic acids such as tricarballylic acid (1,2,3-propanetricarboxylic acid), of aromatic tricarboxylic acids such as trimellitic acid (benzene-1,2,4-tricarboxylic acid) and hemimellitic acid (benzene-1,2,3-tricarboxylic acid), or of cycloaliphatic tricarboxylic acids such as 6-methylcyclohex-4-ene-1,2,3-tricarboxylic acid. Examples of suitable tetracarboxylic dianhydrides are pyromellitic dianhydride or benzophenone-3,3',4,4'-tetracarboxylic dianhydride.

The epoxy resin (a) and the polyester (b) are preferably chosen such that the sum of the epoxide equivalents and of the carboxyl equivalents is in the range from 0.8 to 2.5 per kg of the binder (a)+(b). The ratio of the carboxyl equivalents of the polyester (b) to the epoxide equivalents of the epoxy resin (a) is preferably 0.5:1.5.

A substantial number of waxes and wax-like substances are commercially available. As previously mentioned, U.S. Pat. No. 3,872,040 describes numerous waxes which, as constituent of powder coating compositions, enhance the gloss of coatings obtained with such compositions. In principle, it is possible to use in the practice of this invention as component (c) the same waxes, in conjunction with the metal compounds (d), for producing matt-finish coatings with powder coating compositions. Accordingly, the subject matter of U.S. Pat. No. 3,872,040 falls within the scope of this invention.

The wax or wax-like substance (c) to be used in the practice of this invention preferably has a melting point of >50° C., most preferably of >100° C. It is possible to use natural waxes of vegetable, animal or mineral origin, or also synthetic waxes.

As natural waxes it is preferred to use montan wax, carnauba wax, beeswax, shellac wax, paraffin wax, ceresin, or Japan wax.

Preferred synthetic waxes are reaction products of long chain alcohols ($C_{16}$–$C_{36}$), for example cetyl alcohol, palmityl alcohol or stearyl alcohol, with acids such as stearic acid, palmitic acid or myristic acid; and also glycerides, glycol esters of polyethylene glycol esters of fatty acids, for example of stearic acid; synthetic beeswax, aliphatic amine waxes obtained for example by reaction of hydrogenated castor oil with monoethanolamine; as well as high molecular weight aliphatic amides. Particularly preferred waxes as component (c) are polyamide waxes, fluorinated polyolefin waxes, fatty acid ester waxes, beeswax or, most preferably, unsubstituted polyolefin waxes.

The metal salts or metal complexes of organic compounds suitable for use as component (d) preferably contain magnesium, calcium, aluminium, and, most preferably, zinc.

The organic constituent of component (d) preferably consists of $C_6$–$C_{32}$monocarboxylic acids or derivatives thereof, $C_6$–$C_{13}$phenols or naphthols, $C_5$–$C_{12}$1,3-diketones or, in particular, sulfur-containing compounds.

The monocarboxylic acids are preferably natural fatty acids which may be saturated or mono- or polyunsaturated and/or substituted. Suitable saturated fatty acids are for example caprylic acid, capric acid, lauric acid, myristic acid, palmitic acid and, in particular, stearic acid. Examples of unsaturated acids are palmitoleic acid (9-hexadecenoic acid), oleic acid (9-octadecenoic acid), linoleic acid (9,12-octadecadienoic acid) and linolenic acid (9,12,15-octadecatrienoic acid). Substituted fatty acids can carry alkyl, cycloalkyl, hydroxyl and keto groups.

Examples of suitable fatty acid derivatives are dimers and oligomers, in particular of unsaturated fatty acids, i.e. of compounds containing two or more carboxyl groups per molecule.

The $C_6$–$C_{13}$phenols or naphthols can be substituted in the ring for example by $C_1$–$C_3$alkyl groups, fluorinated $C_1$–$C_3$alkyl groups, halogen atoms or nitro groups.

As $C_5$–$C_{12}$1,3-diketone it is possible to use for example acetyl acetone.

Preferred sulfur-containing compounds are thiols, thiophenols, disulfides or derivatives of thiourea or of thiocarbamic acid. Typical examples of sulfur-containing compounds are: N,N-dimethyldithiocarbamic acid, bis(N,N-dimethylthiocarbamoyl)disulfide, dibenzyldisulfide, N,N'-diisopropylurea, 2-benzothiazolyl-N,N-diethylthiocarbamoylsulfide, 2-benzothiazolethiol (2-mercaptobenzothiazole), tert-dodecylmercaptan (mixture of 2,4,4,6,6-pentamethylheptane-2-thiol and 2,2,4,6,6-pentamethylheptane-4-thiol) and pentachlorothiophenol.

Preferred metal compounds (d) are aluminium stearate or magnesium stearate, aluminium acetylacetonate or zinc acetylacetonate, zinc methacrylate or zinc arachinate, zinc pentachlorothiophenolate or, in particular, zinc 2-benzothiazolethiolate (zinc mercaptobenzothiazole).

In the practice of this invention, the total amount of wax or wax-like substance (c) and of the metal compound (d) is preferably chosen such that it is not more than 20% by weight, preferably from 3 to 10% by weight, based on the binder (a)+(b).

The weight ratio of components (c) and (d) is preferably greater than 2 and, most preferably, greater than 5.

If desired, further additives conventionally employed in the coating industry, for example light stabilisers, dyes and, in particular, deaerating agents, flow control agents and/or pigments, may be added to the powder coating compositions.

Examples of flow control agents are: polyvinyl acetals such as polyvinyl butyral ("Movital" B 30 H ®, manufactured by Hoechst), polyethylene glycol, polyvinyl pyrrolidone, glycerol, acrylic copolymers such as "Modaflow" ® or "Acrylron" MFP ®, manufactured by MONSANTO and PROTEX respectively.

As deaerating agent it is preferred to use benzoin.

The novel powder coating compositions can be prepared by simply mixing the components, for example in a ball mill. Another possibility of preparing them consists in melting the components together, preferably in an extruder, for example in a Buss Kokneader, and then comminuting the cooled melt. The compositions preferably have a particle size in the range from 0.015 to 500 µm, most preferably from 10 to 75 µm.

A further object of the invention is the use of the powder coating composition of the invention for obtaining matt coatings on surfaces, especially on metals such as aluminium or steel. To this end the powder coating composition is applied to the substrate to be coated and heated to not less than 120° C., preferably to 150°–250° C., in order to cure the resin.

The invention further relates to matt coatings obtained by curing the powder coating composition of the invention.

Yet another object of the invention is the use of a composition of matter comprising (c) a wax or wax-like substance, and (d) a metal salt or metal complex of an organic compound, wherein the metal is selected from the group consisting of Mg, Ca, Sr, Ba, Zn, Al, Sn and Sb, as matting agent for epoxy resin powder coating compositions, in particular those cured with carboxyl-terminated polyesters.

A number of powder coating compositions, the use thereof and their properties are illustrated in the following Examples.

USE EXAMPLES

EXAMPLE 1

To prepare a powder coating composition, the following components are mixed for 15 minutes in a free-falling mixer: 930 g of a commercially available carboxyl-terminated saturated polyester conventionally employed for the preparation of powder coating compositions and having an acid number of 33 and a glass transition temperature (DSC) of 58° C. (Uralac P 3900 ®, manufactured by Scado, Zwolle), 70 g of triglycidyl isocyanurate with an epoxide content of 9.4 eq./kg, 2 g of benzoin, 10 g of Modaflow Powder II ® (flow control agent based on poly(2-hydroxyethyl)acrylate adsorbed on silica gel, manufactured by Monsanto) and 500 g of $TiO_2$. The mixture is homogenised at 80°–100° C. in an extruder, cooled, and ground to an average particle size of about 50 µm. The powder is then applied with an electrostatic spray gun to a purified aluminium sheet and cured for 15 minutes at 190° C., giving a film having a thickness of about 60 µm with the properties indicated in Table 1.

EXAMPLE 2

The procedure of Example 1 is repeated, except that additionally 30 g of a polyolefin wax having the general chemical formula $C_nH_{2n+2}$ and a melting point of about 140° C. (Deuteron wax MPO ®, manufactured by Schöner, Bremen) and 5 g of zinc 2-benzothiazolethiolate are added to the mixture in the free-falling mixer.

EXAMPLE 3 500 g of a carboxyl-terminated polyester conventionally employed for powder coating compositions and having an acid number of 79 and a glass transition temperature (DSC) of about 55° C. (Uralac P 2998 ®, manufactured by Scado, Zwolle), 500 g of a bisphenol A epoxy resin with an epoxide content of 1.16 eq./kg and a melting point (according to Mettler) of 102° C., 10 g of Modaflow Powder II ®, 2 g of benzoin and 500 g of TiO₂ are mixed in a free-falling mixer and further processed to a film as described in Example 1.

EXAMPLE 4

The procedure of Example 3 is repeated, except that 10 g of zinc 2-benzothiazolethiolate and 73 g of the wax of Example 2 are added to the mixture.

EXAMPLE 5

The procedure of Example 3 is repeated, except that 10 g of zinc acetylacetonate and 73 g of the wax of Example 2 are added to the mixture.

The properties of the powder coating systems of Examples 1-5 are indicated in Table 1. A film with 100% gloss is obtained with powder coating compositions of Examples 1 and 3 which do not contain a matting agent of the invention. On the other hand, the films prepared with powder coating systems 2, 4 and 5 are characterised by the desired reduced gloss and still have the good mechanical properties of the films which were prepared without any additives.

C. (Lancowachs HM 1666 ®, manufactured by Georg Langer AG, Bremen).

Films with good to very good matt effects (from 60 to 90% gloss) are obtained from the compositions of Examples 6-10.

The gloss values indicated in the Examples are determined by comparison with the Erichsen "Boller Gloss Scale". These are mean values obtained from measurements made by three persons.

Because of the differing surface structure of the powder coatings obtained according to the above Examples, the photometric gloss determination with a reflectometer affords values that are not (directly) comparable. All in all, however, the photometric values are substantially lower than the Boller values, as shown for Example 2.

| Example | Boller value | Photometric value at an angle of reflection of | | |
|---|---|---|---|---|
| | | 20° | 60° | 85° |
| 2 | 60 | 6.9 | 32 | 73 |

EXAMPLES 11-12

A powder coating is prepared in the manner previously described. The powder composition is prepared from the following components:

495 g of a bisphenol A epoxy resin with an epoxide content of 1.35 eq./kg and a softening point (according to DIN 51 920) of 100° C., 500 g of the polyester of Example 3, 5 g of Acrylon MFP ® (flow control agent, manufactured by PROTEX France)

2 g of benzoin 500 g of TiO₂

10 g of zinc 2-benzothiazolethiolate (zinc mercaptobenzothiazole)

TABLE 1

| Example | Metal compound (%)ᵃ | Wax (%)ᵃ | Gloss (%) | Impact resistanceᵇ (cm · kg) | Erichsen value (DIN 53156) (mm) |
|---|---|---|---|---|---|
| 1 | — | — | 100 | 160 | 10 |
| 2 | Zn 2-benzothiazole thiolate 0.5 | PO 3 | 60 | 160 | 9.5 |
| 3 | — | — | 100 | 160 | 10 |
| 4 | Zn 2-benzothiazole thiolate 1 | PO 7.3 | 60 | 160 | 7.6 |
| 5 | Zn acetylacetonate 1 | PO 7.3 | 65 | 160 | 7.0 |

ᵃ% by weight, based on the total amount of binder (epoxy resin + polyester)
PO: polyolefin wax of the general formula $C_nH_{2n+2}$, m.p. about 140° C. (Deuteron wax MPO ®, a product of Schoner, Bremen)
ᵇA force of known weight is dropped from a specific height onto the back of the coated aluminum sheet. The value obtained, height × weight, indicates the greatest impact at which the film still remains intact.

EXAMPLES 6-10

The procedure of Example 3 is repeated, except that the following auxiliaries are added:

in (6): 10 g of aluminium acetyl acetonate and 73 g of the wax of Example 2;

in (7): 10 g of aluminium stearate and 73 g of the wax of Example 2;

in (8): 10 g of magnesium stearate and 73 g of the wax of Example 2;

in (9): 10 g of zinc benzothiazolethiolate and 73 g of a polytetrafluoroethylene wax with a melting point of >315° C. (Polymist F-5A ®, manufactured by Allied Chemical Corporation);

in (10): 10 g of zinc 2-benzothiazolethiolate and 73 g of a polyamide wax with a melting point of >250°

73 g of wax

EXAMPLE 11

Wax=Bärolub LT 100 ®, a fatty acid ester with a melting point of 40° C., manufactured by Bärlocher, Munich.

EXAMPLE 12

Wax=beeswax.

EXAMPLE 13-15

A powder coating is prepared in the manner previously described. The powder composition is prepared from the following components:

495 g of a bisphenol A epoxy resin with an epoxide content of 1.35 eq./kg and a softening point (according to DIN No. 51 920) of 100° C.
500 g of the polyester of Example 3,
5 g of Acrylon MFP ® (flow control agent, manufactured by PROTEX)
2 g of benzoin
500 g of TiO$_2$
73 g of the wax of Example 2
10 g of additive.

EXAMPLE 13

Additive = zinc methacrylate.

EXAMPLE 14

Additive = zinc arachinate.

EXAMPLE 15

Additive = zinc pentachlorothiophenolate ("Renacit 4", manufactured by Bayer).

The properties of the powder coating compositions are indicated in Table 2.

TABLE 2

| Example | Metal compound 1% by weight based on the total amount of binder | Wax, 7.3% by weight, based on the total amount of binder | Gloss (%) | Impact resistance (cm · kg) | Erichsen value (DIN 53 156) (mm) |
| --- | --- | --- | --- | --- | --- |
| 11 | zincmercaptobenzothiazole | Barlub LT 100 ® | 60 | 120 | 8.0 |
| 12 | zincmercaptobenzothiazole | beeswax | 55 | 100 | 5.0 |
| 13 | zincmethacrylate | Deuteron wax MPO ® | 70 | 160 | 9.5 |
| 14 | zincarachinate | Deuteron wax MPO ® | 90 | 160 | 8.5 |
| 15 | zincpentachlorothiophenolate | Deuteron wax MPO ® | 65 | 140 | 8.2 |

What is claimed is:
1. A powder coating composition comprising
   (a) an epoxy resin,
   (b) a saturated carboxyl-terminated polyester,
   (c) a wax, and
   (d) a metal salt or metal complex of an organic compound, wherein the metal is selected from the group consisting of Mg, Ca, Sr, Ba, Zn, Al, Sn and Sb;
   wherein the sum of the epoxide equivalents is from 0.8 to 2.5 per kg of the binder (a) plus (b);
   wherein the amounts of components (a) and (b) are chosen such that the ratio of carboxyl equivalents of the polyester (b) to the epoxide equivalents of the epoxy resin (a) is from 0.5 to 1.5; and
   wherein the total amount of components (c) and (d) is not more than 20% by weight, based on the binder (a) plus (b).
2. A powder coating composition according to claim 1 wherein the weight ratio of components (c) and (d) is greater than 2.
3. A powder coating composition according to claim 1, wherein component (a) contains on average more than one epoxy group in the molecule and is a polyglycidyl derivative of an aromatic compound or of a heterocyclic aromatic compound.
4. A powder coating composition according to claim 1, wherein component (b) contains on average more than 2 carboxyl groups per molecule, has an acid number of 15 to 100 and an average molecular weight in the range from 500 to 10,000.
5. A powder coating composition according to claim 1, wherein component (c) has a melting point of 50° C.
6. A powder coating composition according to claim 5, wherein component (c) is a natural wax of vegetable, animal or mineral origin.
7. A powder coating composition according to claim 5, wherein component (c) is a synthetic wax.
8. A powder coating composition according to claim 5, wherein component (c) is a fluorinated polyolefin wax, a fatty acid ester wax, beeswax or an unsubstituted polyolefin wax.
9. A powder coating composition according to claim 1, wherein the metal of component (d) is Mg, Ca, Al or Zn.
10. A powder coating composition according to claim 1, wherein component (d) is a metal salt or metal complex of a $C_6$–$C_{32}$ monocarboxylic acid or derivative thereof, of a $C_6$–$C_{13}$ phenol or naphthol, of a $C_5$–$C_{12}$ 1,3-diketone or of a sulfur-containing compound.
11. A powder coating composition according to claim 10, wherein the sulfur-containing compound is a thiol, a thiophenol, a disulfide or a derivative of thiourea or of dithiocarbamic acid.
12. A powder coating composition according to claim 1, wherein component (d) is aluminium or magnesium stearate, or aluminium or zinc acetylacetonate.
13. A powder coating composition according to claim 1, wherein component (d) is zinc 2-benzothiazolethiolate (zinc mercaptobenzothiazole).
14. A powder coating composition according to claim 1, wherein the total amount of components (c) and (d) is from 3 to 10% by weight, based on the binder (a) + (b).
15. A powder coating composition according to claim 1, wherein the weight ratio of components (c) and (d) is greater than 1.
16. A powder coating composition according to claim 1, which additionally contains a deaerating agent, a flow control agent and/or a pigment.
17. A process for preparation of a matt coating on a surface, which comprises
   applying a powder coating composition according to claim 1 to the surface to be coated, and
   heating the coated surface to a temperature of not less than 120° C. to cure said composition.

* * * * *